United States Patent [19]
Nurnberg et al.

[11] Patent Number: 5,115,900
[45] Date of Patent: May 26, 1992

[54] HANDRAIL AIR CUSHION

[75] Inventors: Thomas R. Nurnberg, Bettendorf, Iowa; Ernie G. Seggebruch, Geneseo, Ill.; Kenneth J. Smith, Princeton, Iowa

[73] Assignee: Montgomery Elevator Company, Moline, Ill.

[21] Appl. No.: 754,388

[22] Filed: Sep. 3, 1991

[51] Int. Cl.⁵ .............................................. B65G 15/00
[52] U.S. Cl. ................................. 198/335; 198/811
[58] Field of Search ...................... 198/335, 337, 811

[56] References Cited
U.S. PATENT DOCUMENTS

| | | | |
|---|---|---|---|
| 3,620,346 | 11/1971 | Brooke et al. | 198/335 |
| 3,719,265 | 3/1973 | Redding et al. | 198/335 |
| 5,036,970 | 8/1991 | Fastner | 198/811 |

Primary Examiner—Robert P. Olszewski
Assistant Examiner—Cheryl L. Gastineau
Attorney, Agent, or Firm—Wood, Phillips, Van Santen, Hoffman & Ertel

[57] ABSTRACT

An air supporting system is provided for a handrail of a passenger conveyor and includes a plenum. An air supply provides air flow to the plenum. A guide is mounted on one side thereof to the plenum. The guide includes at least one air pocket. A handrail is slidably engaged with the guide. An orifice through the guide allows air to pass from the enclosed space to the air pocket. The air in the pocket generates pressure and lift to the handrail as it is driven to decrease friction between the handrail and the guide and to support the handrail above the guide.

9 Claims, 4 Drawing Sheets

HANDRAIL AIR CUSHION

FIELD OF THE INVENTION

This invention generally relates to a balustrade of a passenger conveyor, such as an escalator, a moving walkway or the like, and, more particularly, to a balustrade having a handrail supported by an air cushion.

BACKGROUND OF THE INVENTION

A passenger conveyor has held an important position as indispensable transportation equipment inside a building and its use has been widespread. The construction of a typical passenger conveyor includes a main body frame supported by the framework of the building, balustrades supported by the main body frame, handrails, and passenger platforms arranged and circulated endlessly in synchronism with the handrails.

One conventional balustrade includes glass panels supported by the main body frame, a handrail frame unit supported by the glass panel and a guide secured to the handrail frame unit. The handrail is slidably engaged with the guide. Location of the handrail frame unit below the handrail and, thus, in the passenger's view is undesirable aesthetically. Further, handrail drag in the newel end of the passenger conveyor is a persistent problem which typically was addressed with a large roller in solid balustrades and small roller clusters in glass balustrades. The smaller roller clusters in these glass balustrade designs rotate relatively fast and wear quickly. Roller designs create undesirable noise. In addition, these designs still have handrail drag in the newel end.

Both the large rollers in solid balustrades and the small roller clusters in glass balustrades have the problem that powder is produced by abrasion of the handrail and accumulates on the handrail frame. As a result, the powder often is transferred to the passengers' hands and subsequently their clothing.

Current trends are to make the handrails look as if they are floating in space, i.e., a suspended look. The suspended look ideally shows only the handrail "floating" on the glass without the conventional handrail frame unit located in sight below the handrail. The newer, slim, transparent balustrades have little room for rollers and/or were limited to slides which have significant problems with handrail life, handrail drive slippage, and handrail wear.

The instant invention provides a newel air slide with a series of pockets which are individually supplied with air via sized orifices from a common air supply. The air supplied to the pockets generates pressure to "float" the handrail off of the newel slide to reduce the friction or drag to a minimal amount. As a result, the powder produced by abrasion of the handrail is reduced. Noise is considerably eliminated. Unsightly frame unit mass is reduced, and the desired "floating" look of the handrail is maintained.

SUMMARY OF THE INVENTION

An object, therefore, of the invention is to provide a new and improved balustrade of the character described.

In the exemplary embodiment of the invention a balustrade having a handrail supported by an air cushion is provided for a passenger conveyor. The conveyor includes a main body frame and a plurality of passenger platforms or steps supported by and adjacent to the main body frame. The steps are connected together and mounted on the frame to circulate endlessly to transport the passenger. The balustrade includes panels supported by the frame on opposite sides of the platforms to form perpendicular side walls. A plenum is mounted on a distal end of the panels lying above the frame. The plenum receives air from an air supply located beneath the frame. One side of a handrail guide is mounted to a top portion of the plenum. The opposite side of the handrail guide, facing outward, includes an air pocket. An orifice through the guide supplies air from the plenum to the air pocket. A handrail is slidably engaged with the guide over the air pockets. The air delivered into the plenum passes through the orifice in the guide and into the air pocket. Pressure builds in the air pocket and provides lift to the handrail to decrease friction between the guide and the handrail. Pressure builds until equilibrium is reached when lift exceeds a normal force of the hand rail and air escapes between the handrail and guide.

In a preferred form of the invention, a plurality of pockets are provided. Each pocket is supplied by an orifice. The sizes of the pockets and orifices are interrelated and varied to increase or decrease the lift provided at predetermined portions of the guide to increase or decrease the pressure as desired.

Other objects, features and advantages of the invention will be apparent from the following detailed description taken in connection with the accompanying drawings.

BRIEF DESCRIPTION OF THE DRAWINGS

The features of this invention, which are believed to be novel, are set forth with particularity in the appended claims. The invention, together with its objects and the advantages thereof, may be best understood by reference to the following description taken in conjunction with the accompanying drawings, in which like reference numerals identify like elements in the Figures and in which:

DETAILED DESCRIPTION OF THE PREFERRED EMBODIMENT

The concepts of this invention are exemplified in a balustrade disclosed herein and illustrated in FIGS. 1 to 6.

Figure 1:
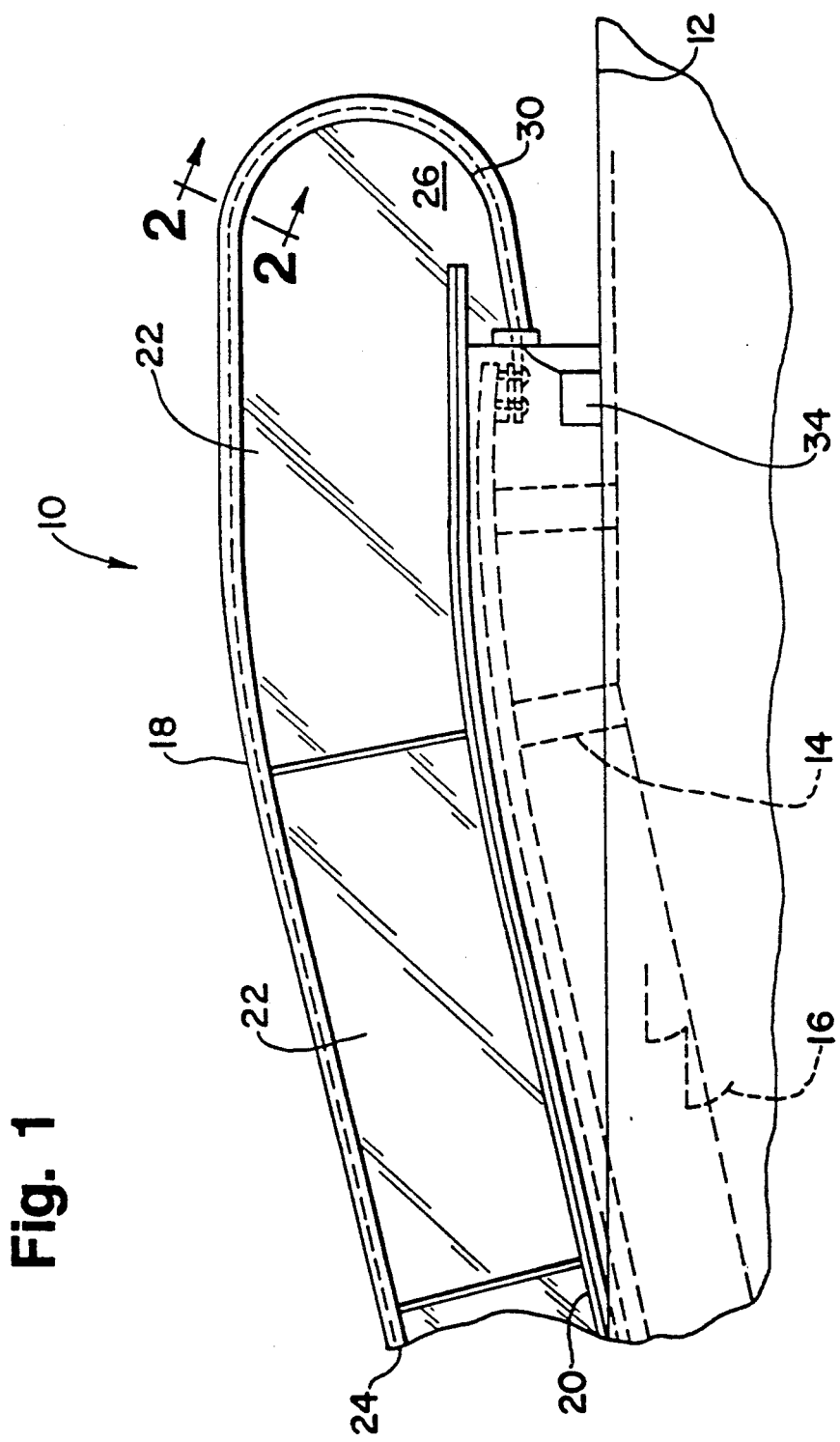
FIG. 1 is a somewhat schematic, fragmented side elevational view of a part of a passenger conveyor according to the present invention.

FIG. 1 shows a passenger conveyor, generally designated 10, supported on a floor 12 by a main body frame 14. A plurality of steps 16 (only two are illustrated) are arranged in main body frame 14 to circulate endlessly. A balustrade is disposed above the main body frame 14 for guiding handrails 18 circulating in synchronism with steps 16. The balustrade includes a deck 20, a plurality of glass panels 22 aligned in an end-to-end relation and rising from the deck and a guide 24 secured to the upper portion of the glass panels for guiding the handrail.

In a newel end 26 of the conveyor, a plenum 30 is located between endmost glass panel 22 and guide 24. An air supply 34 provides air flow to plenum 30.

Figure 2:
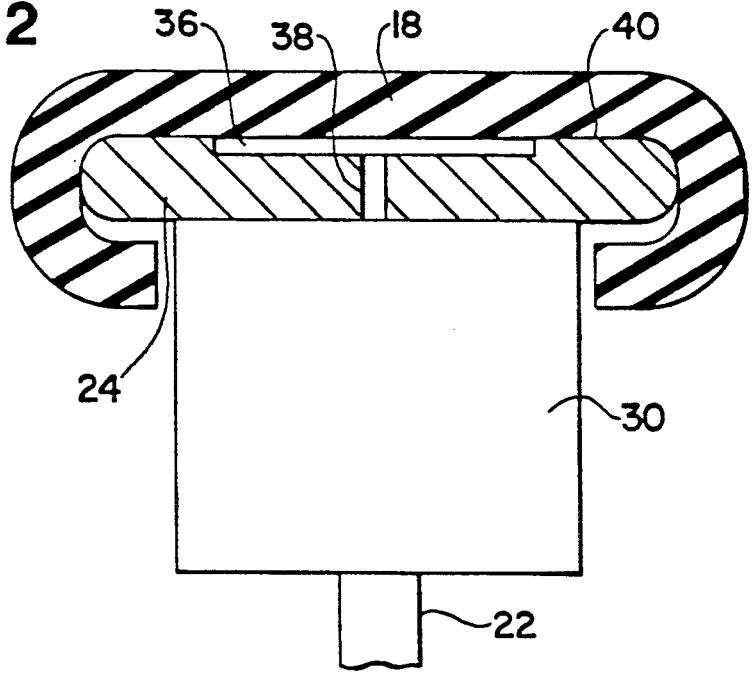
FIG. 2 is a section, taken generally along line 2—2 of FIG. 1, showing a section of the balustrade and handrail with no air supplied to the air pockets.

FIG. 2, a section taken generally along line 2—2 of FIG. 1, shows plenum 30, guide 24, and handrail 18 in greater detail. Guide 24 has a substantially rectangular cross section with rounded corners. Handrail 18 is generally C-shaped, as is conventional, and includes and inner portion 40 which substantially conforms to the shape of guide 24. Note that guide 24 is fully enclosed within the C-shaped handrail 18. Guide 24 includes a plurality of pockets 36 supplied with air through a restricting orifice 38 by plenum 30. If plenum 30 and glass panels 22 are transparent, handrail 18 will appear to "float". Guide 24 is opaque, but it is enclosed by handrail 18.

Figure 3:
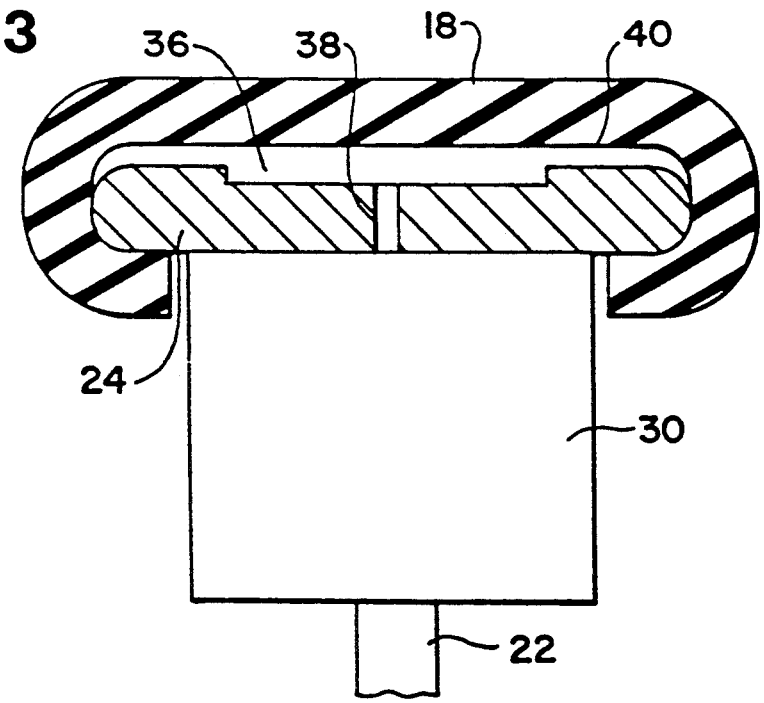
FIG. 3 is a view similar to FIG. 2, except that pressurized air is provided to the air pockets.

Air supply 34 reaches equilibrium pressure inside plenum 30 at about 3-4 psi. The air pumped into the plenum is forced through orifices 38 to pockets 36 to generate a pressure acting radially outward against handrail 18, as shown in FIG. 3. A seal is created over pockets 36 because of the close contact and normal force of handrail 18 with edges 39 of the pockets 36 and the top of guide 24. Resultant pressure in the pockets 36 provides lift to the handrail 18. If insufficient pocket pressure results from poor guide sealing, guide wear can occur. However, guide wear is conforming and allows the guide to create a correct seal between pockets 36 and the handrail, resulting in increased pressure and lift in pockets 36.

As the pressure rises in pockets 36, the handrail lifts off guide 24 to open the pockets and release the air normally sealed by the underside of handrail 18, to create an air film between the guide and the handrail. Several advantages are obtained by this design. First, handrail 18 acts as a pressure-regulator and air supply 34 pressure is inherently controlled and varied by handrail load at all times. Second, when the air is released as pockets 36 open up under increased pressure, the air provides a natural cleaning effect by flushing any handrail wear particles or dust or other debris from inside the pocket area. As a result, dirty particles are less likely to come into contact with a passenger's hands or clothing. Third, if foreign particles enter into the area between handrail 18 and guide 24, they too are flushed out when the handrail raises or lifts due to increased pressure in the pocket area 36.

Thus handrail 18 acts as a pressure regulator. When pockets 36 have insufficient pressure to float the handrail due to excess leakage, handrail wear occurs. The wear is conforming and thus handrail 18 creates a correct seal over pockets 36. The corrected seal will increase the "float" effects. When the air flow exceeds the seal leakage from pockets 36, pressure increases and the handrail lifts off guide 24 and opens the pockets 36 to decrease pocket pressure and equilibrium is achieved.

The loads on handrail 18 typically are from tension. In an escalator, the loads on the handrail typically are in the newel end 26. As can be seen from FIG. 1, the weight of the passenger conveyor is downhill. Thus, the present invention contemplates providing the air support for the handrail at least at the newel end 26. If desired, air support can be applied to the handrail along the entire length of the passenger conveyor. If the newel end 26 is a semicircle, theoretically the loads on the handrail will be uniform and, thus, neither variable orifice size nor variable pocket size may be required. However, differential load patterns occur due to design tolerances, elliptical newel cross section, etc. In such designs, variable pocket size and/or variable orifice size may be required.

While the air lift of the present invention is described with respect to the newel ends of the passenger conveyor, the present invention is applicable anywhere along guide 24 where drag or friction occurs with handrail 18.

Figure 4:
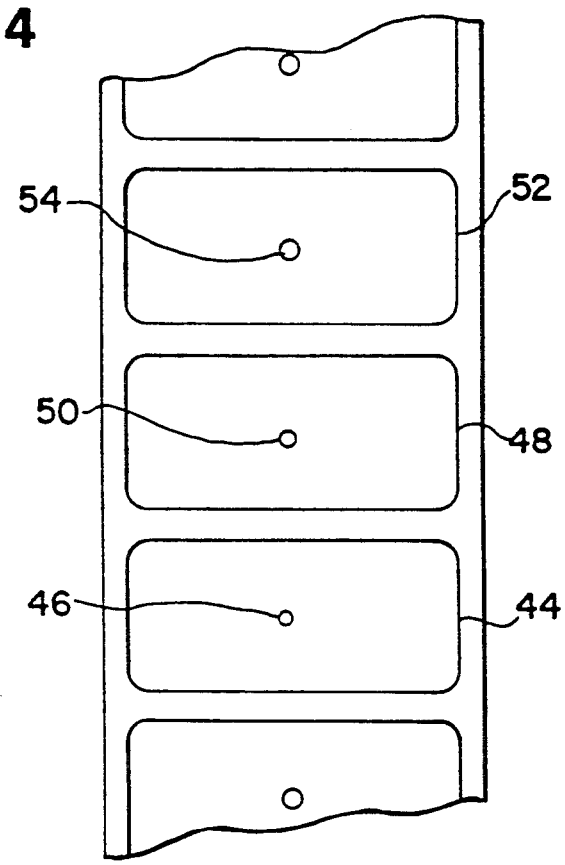
FIG. 4 is a fragmented top view of the handrail guide and air pockets.

FIG. 4 shows a top view of the guide means including variable sized orifices 46, 50, 54. As can be seen, the restricting orifices 46, 50, 54 increase in size, respectively. As a result, pocket 44 would have a smaller amount of lift than pocket 48 which, in turn, would have a smaller amount of lift than pocket 52. Alternatively, the orifices in FIG. 4 could remain the same while pockets 44, 48 and 52 could be incremented in size to obtain the same effects.

Figure 5:
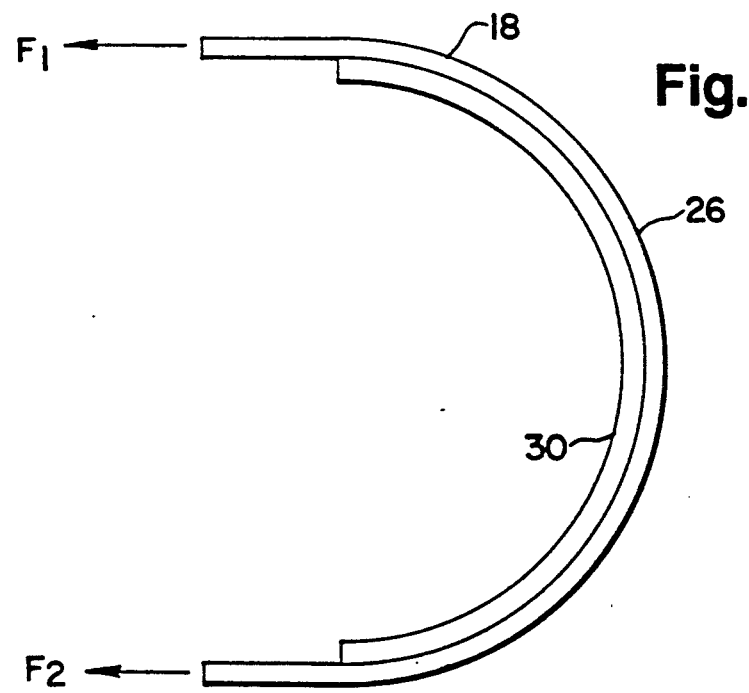
FIG. 5 is a side view of the newel end of a passenger conveyor according to the present invention.
Figure 6:
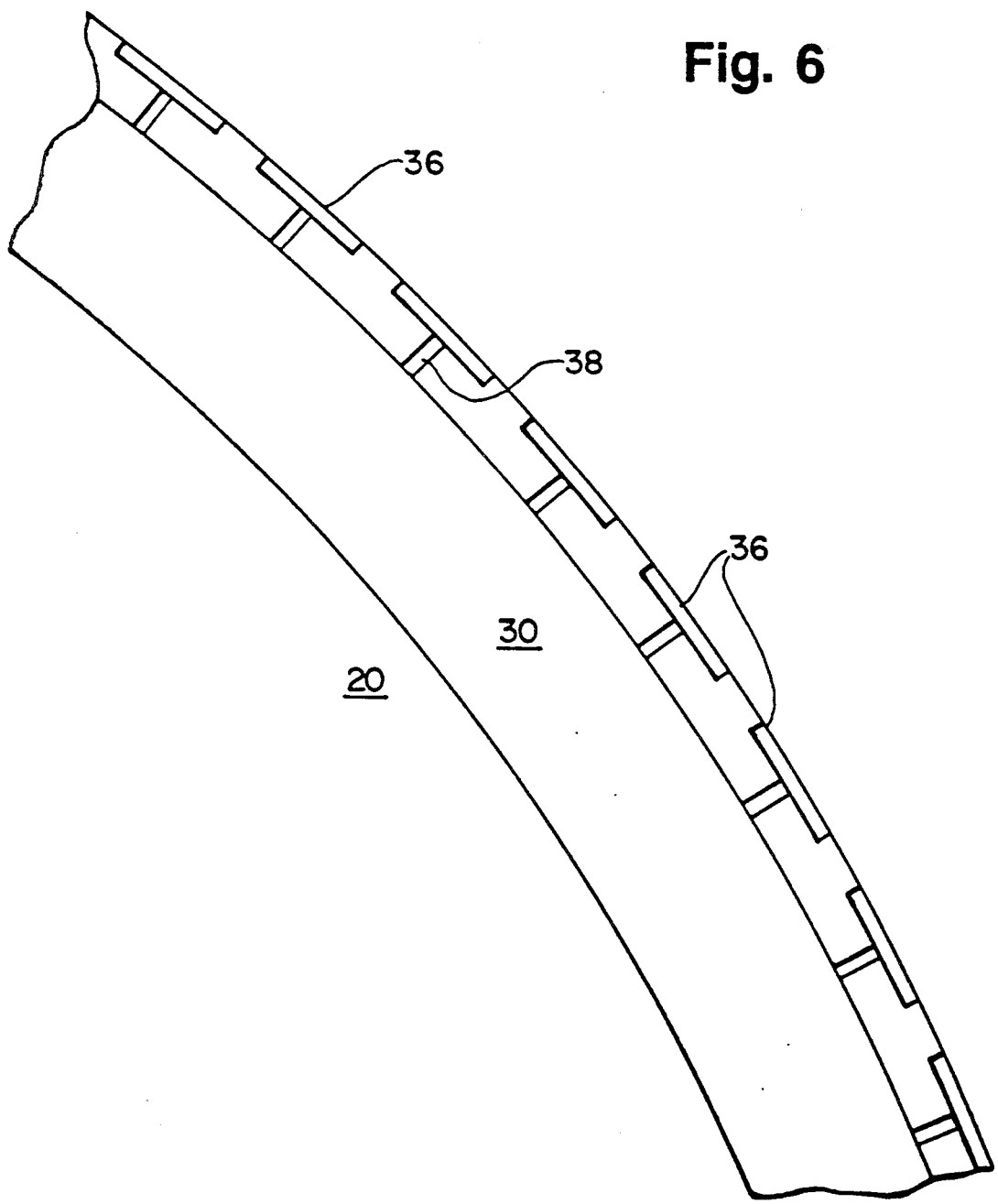
FIG. 6 is an enlarged view of a portion of the newel end shown in FIG. 5.

As can be seen in FIG. 5, the forces resulting from tension and handrail drag at the newel end 26 of handrail 18 are identified by $F_1$ and $F_2$. According to the invention, the sum of $F_1$ and $F_2$ should be approximately equal to the number of pockets multiplied by the pocket area and the pocket pressure. The pocket pressure is related to the orifice size and leakage. For example, assume that each pocket 36 has the same orifice size and leakage and each orifice 38 achieves 2 psi in its pocket area. Assuming that the pocket size is $1'' \times 2''$ and there are 25 pockets in the newel end, 100 lbs. of lift are provided to handrail 18. This is a minimum value since additional lift is generated by the air film layer around perimeters of the pockets.

While the balustrade design is described with respect to a passenger conveyor which traverses an incline, it can be appreciated that the present invention has application to moving walkways because of the weight and driving forces imparted to the handrail. A single direction moving walkway would find similar advantages by using the air lift of the present invention at one end thereof. A bi-direction walkway desirably would incorporate the air lift of the present invention at both ends.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A balustrade for a passenger conveyor which includes a main body frame and a plurality of passenger platforms supported by the main body frame wherein the platforms are connected together and mounted on the frame to circulate endlessly, the balustrade comprising:

a panel supported by the main frame to form a side wall;

a plenum, mounted on a top side of the panel;

a guide, mounted on one side thereof to the plenum, the guide including at least one air pocket located on its opposite side;

a handrail slidingly engaged with the guide;

an air supply providing air flow to the plenum;

an orifice through the guide to allow air to pass under pressure from the plenum to the air pocket, the air pressure in the pocket providing lift to the handrail to decrease friction between the handrail and the guide, to support the handrail above the guide and to provide an air bearing interface between the handrail and the guide.

2. The balustrade of claim 1, wherein the panels and the plenum are transparent.

3. The balustrade of claim 1, wherein the handrail is substantially C-shaped whereby legs of the C-shape engage an underside of the guide and substantially enclose the guide.

4. The balustrade of claim 1, wherein a plurality of pockets are provided, each pocket being supplied with air from the plenum passing through the guide via an orifice.

5. The balustrade of claim 4, wherein the size of the pockets are varied to increase or decrease the lift provided at a particular portion of the guide.

6. The balustrade of claim 4, wherein the size of the orifices are varied to increase or decrease the lift provided at a particular portion of the guide.

7. An air supporting means for a movable handrail, in a passenger conveyor comprising:
   a plenum;
   an air supply providing air flow to the plenum;
   a handrail guide mounted on one side thereof to the plenum, the guide including at least one air pocket on an opposite side thereof;
   a handrail slidably engaged with the guide; and
   an orifice in the handrail guide allowing air to pass therethrough under pressure from the plenum to the air pocket, the air pressure in the pocket providing lift to the handrail as it is driven to decrease friction between the handrail and the guide and to support the handrail above the guide.

8. The balustrade of claim 7 wherein the handrail substantially encloses the guide.

9. The balustrade of claim 8 wherein the handrail is substantially C-shaped whereby legs of the C-shape engage an underside of the guide.

* * * * *